(12) United States Patent
Jung et al.

(10) Patent No.: US 9,199,663 B2
(45) Date of Patent: Dec. 1, 2015

(54) RACK-DRIVEN AUXILIARY POWER STEERING APPARATUS

(71) Applicant: MANDO CORPORATION, Gyeonggi-do (KR)

(72) Inventors: Dae Hee Jung, Gyeonggi-do (KR); Hong Yong Bhae, Gyeonggi-do (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 104 days.

(21) Appl. No.: 13/681,097

(22) Filed: Nov. 19, 2012

(65) Prior Publication Data

US 2013/0126261 A1  May 23, 2013

(30) Foreign Application Priority Data

Nov. 17, 2011  (KR) .................. 10-2011-0120352

(51) Int. Cl.
| | |
|---|---|
| *B62D 5/04* | (2006.01) |
| *F16H 25/20* | (2006.01) |
| *F16H 25/24* | (2006.01) |
| *F16H 55/36* | (2006.01) |

(52) U.S. Cl.
CPC ............ *B62D 5/0448* (2013.01); *B62D 5/0421* (2013.01); *B62D 5/0424* (2013.01); *B62D 5/0472* (2013.01); *F16H 25/20* (2013.01); *F16H 25/24* (2013.01); *F16H 2055/366* (2013.01)

(58) Field of Classification Search
CPC .. B62D 5/0448; B62D 5/0472; B62D 5/0424; F16H 25/20; F16H 25/2214

USPC ............ 180/443, 444; 74/89.2, 89.22, 89.23, 74/388 PS

See application file for complete search history.

(56) References Cited

U.S. PATENT DOCUMENTS

| | | | |
|---|---|---|---|
| 6,171,194 B1* | 1/2001 | Haga et al. ...................... 464/89 |
| 6,386,065 B1* | 5/2002 | Hodjat .......................... 74/574.4 |
| 6,880,676 B2* | 4/2005 | Tsukada et al. ................... 184/5 |
| 6,883,635 B2* | 4/2005 | Lynn et al. .................... 180/444 |
| 7,055,646 B2* | 6/2006 | Bugosh ......................... 180/444 |
| 7,152,496 B2* | 12/2006 | Chen et al. ................... 74/89.26 |
| 7,694,600 B2* | 4/2010 | Osterlaenger et al. ...... 74/424.82 |
| 8,291,782 B1* | 10/2012 | Shaheen et al. ............. 74/89.26 |
| 8,479,605 B2* | 7/2013 | Shavrnoch et al. ........ 74/388 PS |
| 2002/0148673 A1* | 10/2002 | Menjak et al. ................ 180/444 |
| 2003/0192734 A1* | 10/2003 | Bugosh ......................... 180/444 |
| 2004/0007417 A1* | 1/2004 | Lynn et al. .................... 180/444 |
| 2004/0099472 A1* | 5/2004 | Johnson et al. ............... 180/444 |
| 2013/0247701 A1* | 9/2013 | Kiforiuk et al. ........... 74/424.86 |

FOREIGN PATENT DOCUMENTS

| | | |
|---|---|---|
| CN | 1766359 A | 5/2006 |
| JP | 2010247675 A * | 11/2010 ............... B62D 5/04 |

* cited by examiner

*Primary Examiner* — Anne Marie Boehler
*Assistant Examiner* — Maurice Williams
(74) *Attorney, Agent, or Firm* — McDermott Will & Emery LLP (57) ABSTRACT

A rack-driven auxiliary power steering apparatus prevents a ball nut and a nut pulley from idling due to a slip thereof and increases durability when the drive belt is operated by driving of a motor, and minimizes vibrations and noise transferred through the rack bar, the ball nut, and the nut pulley when the rack bar is slid while the nut pulley and the ball nut are rotating, thereby providing a comfortable steering feeling to the driver.

11 Claims, 9 Drawing Sheets

RACK-DRIVEN AUXILIARY POWER STEERING APPARATUS

CROSS-REFERENCE TO RELATED APPLICATION

This application claims priority from and the benefit under 35 U.S.C. §119(a) of Korean Patent Application No. 10-2011-0120352, filed on Nov. 17, 2011, which is hereby incorporated by reference for all purposes as if fully set forth herein.

BACKGROUND OF THE INVENTION

1. Field of the Invention

The present invention relates to a rack-driven auxiliary power steering apparatus, and more particularly to a rack-driven auxiliary power steering apparatus which prevents a ball nut and a nut pulley from idling due to a slip thereof and increases durability when the drive belt is operated by driving of a motor, and minimizes vibrations and noise transferred through the rack bar, the ball nut, and the nut pulley when the rack bar is slid while the nut pulley and the ball nut are rotating, thereby providing a comfortable steering feeling to the driver.

2. Description of the Prior Art

Hydraulic power steering apparatuses using a hydraulic power of a hydraulic pump have been generally used as auxiliary power steering apparatuses for a vehicle, but in recent years, electric power steering apparatuses using a motor are being gradually commonly used.

A general electric power steering apparatus includes a steering system extending from a steering wheel to two wheels, and an auxiliary power mechanism for supplying auxiliary steering power to the steering system.

The auxiliary power mechanism includes a torque sensor for detecting a steering torque applied to a steering wheel by the driver and outputting an electric signal proportional to the detected steering torque, an electronic control unit (ECU) for generating a control signal based on the electric signal transferred from the torque sensor, a motor for generating auxiliary steering power based on the control signal transferred from the electronic control unit, and a belt type power transmission unit for transmitting auxiliary power generated by the motor to a rack bar via a belt.

Figure 1:
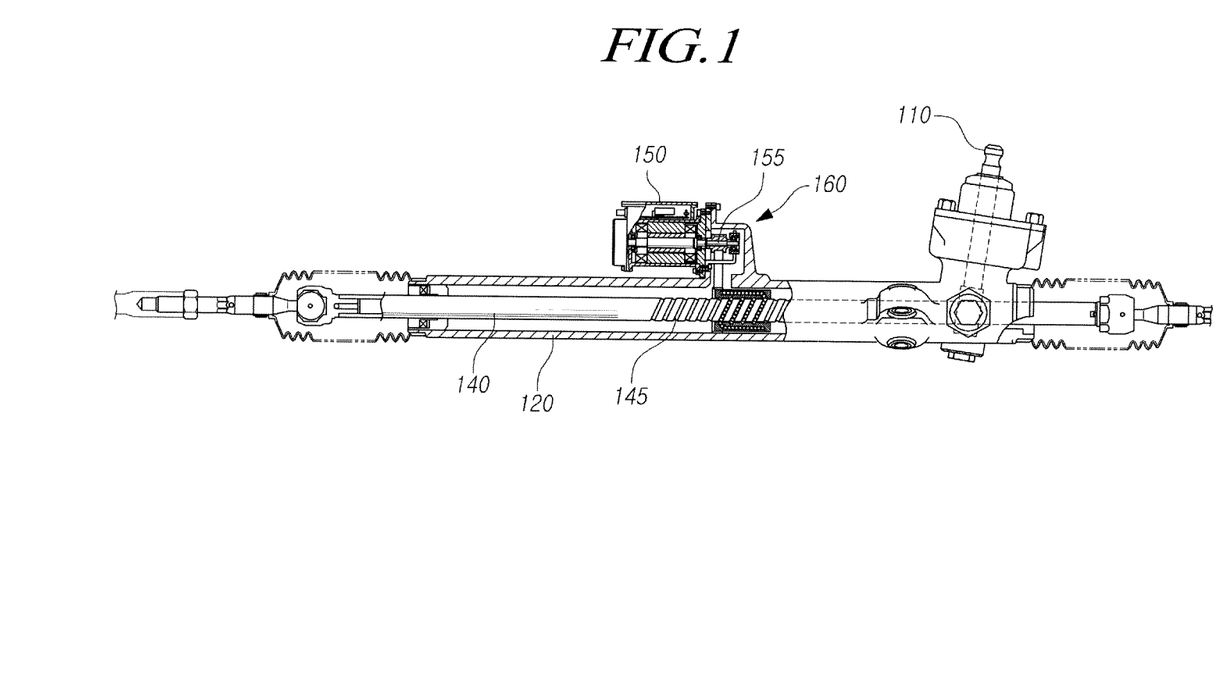
FIG. 1 is a partially sectional view schematically illustrating a rack-driven auxiliary power steering apparatus according to the related art.
Figure 2:
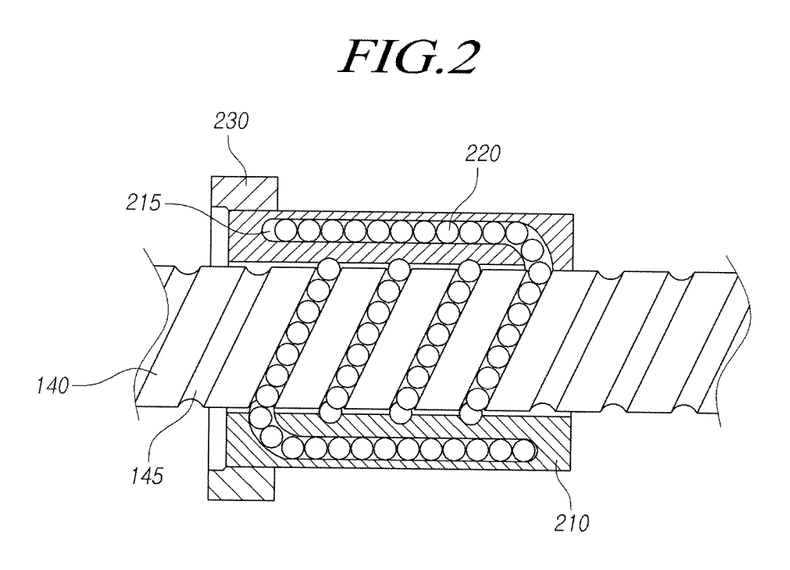
FIG. 2 is a sectional view schematically illustrating a portion of the rack-driven auxiliary power steering apparatus according to the related art.

FIG. 1 is a partially sectional view schematically illustrating a rack-driven auxiliary power steering apparatus according to the related art, and FIG. 2 is a sectional view schematically illustrating a portion of the rack-driven auxiliary power steering apparatus according to the related art.

As illustrated in FIGS. 1 and 2, the rack-driven auxiliary power steering apparatus according to the related art includes a rack bar 140 extending in a transverse direction of the vehicle and having a rack gear at one side of an outer peripheral surface thereof, a pinion shaft 110 having a pinion gear engaged with the rack gear, a ball nut 210 engaged with an outer peripheral screw groove 145 via balls 220, a belt type power transmission unit 160 connecting a ball nut 210 and a motor shaft 155, and a motor 150.

The pinion shaft 110 is connected to a steering wheel through a steering shaft, and the rack bar 140 having the outer peripheral screw groove 145 of a predetermined length at one side of the outer peripheral surface thereof is installed within a rack housing 120.

The belt type power transmission unit 160 includes a motor pulley coupled to the motor shaft 155 and a nut pulley coupled to the ball nut 210, and transmits auxiliary steering power generated by the motor 150 in proportion to the steering torque applied to the steering wheel to the rack bar 140 through the ball nut 210.

The rack-driven auxiliary power steering apparatus according to the related art includes the rack bar 140 having the outer peripheral screw groove 145 on an outer peripheral surface thereof, the ball nut 210 having an intermediate path 215 along which balls 220 circulate, the balls 220 rolling while contacting the outer peripheral screw groove 145 of the rack bar 140 and the intermediate path 215, and an end cap 230 attached to an end of the ball nut 210.

In the rack-driven auxiliary power steering apparatus according to the related art, the rack bar 140 is slid as the balls 220 roll while contacting the outer peripheral screw groove 145 of the rack bar 140 and an inner peripheral screw groove of the ball nut 210.

However, according to the related art, idling occurs as a slip is generated between the ball nut and the nut pulley, deteriorating power transmission efficiency and making it difficult to accurately transmit an auxiliary steering power.

Further, noise and vibrations are generated in the rack bar, the ball nut, the nut pulley, the bearing, and the rack housing when the rack bar is slid while the ball nut is rotated, which noise and vibrations are transferred to other components, causing the coupled components to be released.

In addition, the transferred noise and vibrations are transferred to the driver together with vibrations and noise of other parts, deteriorating a steering feeling of the driver.

SUMMARY OF THE INVENTION

Accordingly, the present invention has been made to solve the above-mentioned problems occurring in the prior art, and an object of the present invention is to provide a rack-driven auxiliary power steering apparatus which prevents the ball nut and the nut pulley from idling due to a slip thereof and increases durability when the drive belt is operated by driving of a motor, and minimizes vibrations and noise transferred through the rack bar, the ball nut, and the nut pulley when the rack bar is slid while the nut pulley and the ball nut are rotating, thereby providing a comfortable steering feeling to the driver.

In order to accomplish this object, there is provided a rack-driven auxiliary power steering apparatus including: a ball nut coupled to a rack bar via balls and having a first axial groove on an outer peripheral surface thereof; a nut pulley coupled to an outer peripheral surface of the ball nut and having a second groove at a location corresponding to the first groove; and a resilient support member coupled between the ball nut and the nut pulley.

The rack-driven auxiliary power steering apparatus according to the present invention prevents the ball nut and the nut pulley from idling due to a slip thereof and increases durability when the drive belt is operated by driving of a motor, and minimizes vibrations and noise transferred through the rack bar, the ball nut, and the nut pulley when the rack bar is slid while the nut pulley and the ball nut are rotating, thereby providing a comfortable steering feeling to the driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
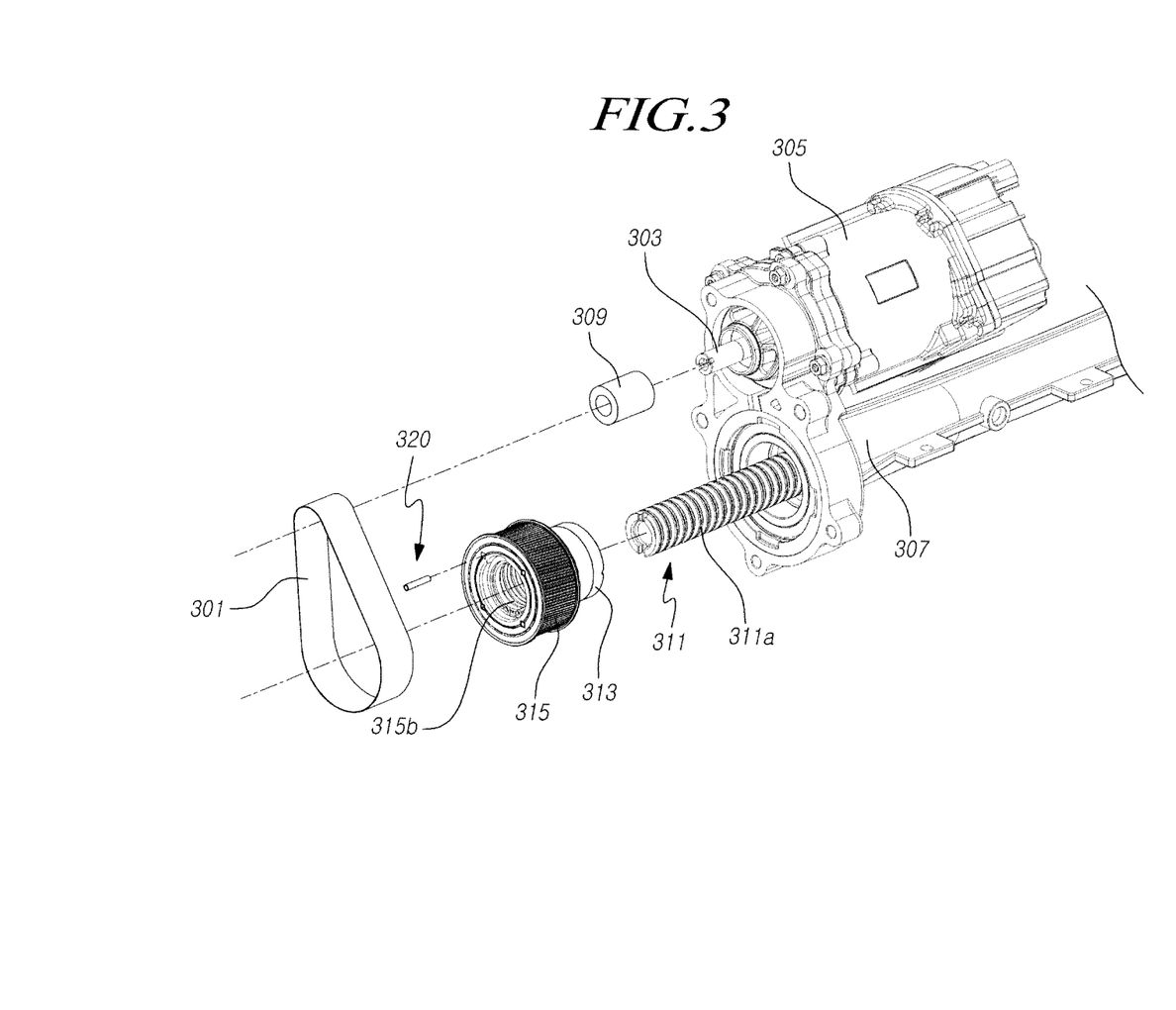
FIG. 3 is an exploded perspective view illustrating a portion of a rack-driven auxiliary power steering apparatus according to an embodiment of the present invention.
Figure 4:
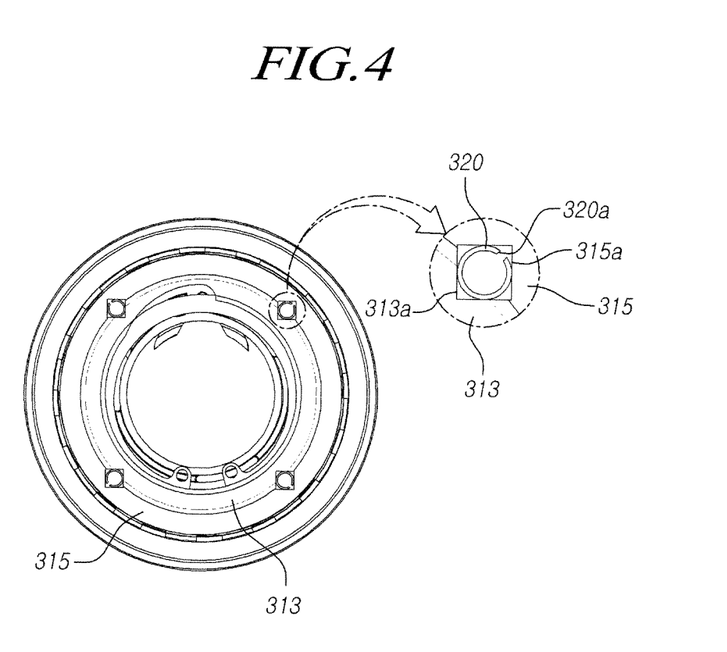
FIG. 4 is a front view illustrating a portion of the rack-driven auxiliary power steering apparatus according to an embodiment of the present invention.

FIG. 3 is an exploded perspective view illustrating a portion of a rack-driven auxiliary power steering apparatus according to an embodiment of the present invention. FIG. 4 is a front view illustrating a portion of the rack-driven auxiliary power steering apparatus according to an embodiment of the present invention. FIGS. 5 to 8 are perspective views illustrating resilient support members according to various embodiments of the present invention. FIG. 9 is a front view illustrating a portion of a rack-driven auxiliary power steering apparatus illustrated in FIG. 8.

As illustrated in the drawings, the rack-driven auxiliary power steering apparatus according to the present invention includes a ball nut 313 coupled to a rack bar 311 via balls (not illustrated) and having a first axial groove 313a on an outer peripheral surface thereof, a nut pulley 315 coupled to an outer peripheral surface of the ball nut 313 and having a second groove 315a at a location corresponding to the first groove 313a, a resilient support member 320, 330, 340, 350, or 360 coupled between the ball nut 313 and the nut pulley 315.

The rack-driven auxiliary power steering apparatus includes a driving unit and a driven unit, and the driving unit includes an electric motor 305 controlled by an electronic control unit (ECU), a motor pulley 309 coupled to a shaft 303 of the electric motor 305, and a drive belt 301.

In the driven unit, the ball nut 313 supporting the rack bar 311 is provided within a rack housing 307 surrounding the rack bar 311, and the nut pulley 315 is separately formed from and coupled to, or integrally formed with an outer peripheral surface of the ball nut 313.

The motor pulley 309 connected to the electric motor 305 and the nut pulley 315 connected to the rack bar 311 are disposed parallel to each other, the drive belt 301 is mounted on the motor pulley 309 and the nut pulley 315 to transmit a rotating force of the electric motor 305 to the rack bar 311 through the ball nut 313, and the rack bar 311 is moved leftward and rightward by an operation of the ball nut 313 to generate an auxiliary steering force.

The ball nut 313 is coupled to the rack bar 311 via balls to slide the rack bar 311 within the rack housing 307 and the gear housing (not illustrated) while rotating, and a nut pulley 315 for rotating the ball nut 313 and a bearing for supporting rotation of the ball nut 313 are mounted to an outer peripheral surface of the ball nut 313.

A power transmission structure is provided between an inner peripheral surface of the ball nut 313 and an outer peripheral surface of the rack bar 311 to axially slide the rack bar 311 in order to generate an auxiliary steering force, and the power transmission structure includes an outer peripheral screw groove 311a formed spirally on an outer peripheral surface of the rack bar 311 and having a semispherical or arc-shaped cross-section, balls inserted thereinto (not illustrated), and an inner peripheral screw groove 315b formed spirally on an inner peripheral surface of the ball nut 313 to correspond to the outer peripheral screw groove 311a and having a semispherical or arc-shaped cross-section.

The ball nut 313 is a hollow tube having an inner peripheral screw groove 315a on an inner peripheral surface thereof, the nut pulley 315 is attached to one side of an outer peripheral surface of the ball nut 313, a bearing (not illustrated) is installed at an opposite side of the ball nut 313, and lock screws (not illustrated) are screw-coupled to an inner peripheral surface of the rack housing 307 at an end of an outer race of the bearing and one end of an outer peripheral surface of the bearing to be fixed while supporting the bearing.

The ball nut 313 is coupled to the rack bar 311 via balls and the first axial groove 313a is formed on an outer peripheral surface of the ball nut 313, and the second groove 315a is formed in the nut pulley 315 coupled to an outer peripheral surface of the ball nut 313 at a location corresponding to the first groove 313a of the ball nut 313.

Thus, if the nut pulley 315 is coupled to an outer peripheral surface of the ball nut 313, the first groove 313a and the second groove 315a define an axial empty space.

A resilient support member 320, 330, 340, 350, or 360 is coupled to the space defined by the first groove 313a of the ball nut 313 and the second groove 315a of the nut pulley 315, preventing the ball nut 313 and the nut pulley 315 from idling and absorbing vibrations and noise.

The first groove 313a and the second groove 315a are formed at locations corresponding to each other to define an axial space into which the resilient support member may be inserted, and it should be noted that the cross-sectional shape of the resilient support member, such as a circular shape, an elliptical shape, and a polygonal shape, is not limited thereto and a rectangular cross-section is exemplified in the description and drawings of the present invention.

In this way, the resilient support member 320, 330, 340, 350, or 360 coupled to the axial space defined by the ball nut 313 and the nut pulley 315 may be realized in various embodiments of the present invention, and first, the resilient support member 320 illustrated in FIGS. 3 and 4 has a cutaway portion 320a axially cut from one end to an opposite end thereof to have a hollow shape.

The resilient support member 320 may have a cylindrical shape obtained by bending a thin plate formed of a material such as a metal, plastic, and rubber, and has the cutaway portion 320a axially cut from one end to an opposite end thereof so that when the resilient support member 320 is coupled to the first groove 313a and the second groove 315a, a resilient force is generated by the resilient support member 320 to widen the resilient support member 320 outward, supporting the ball nut 313 and the nut pulley 315.

Figure 5:
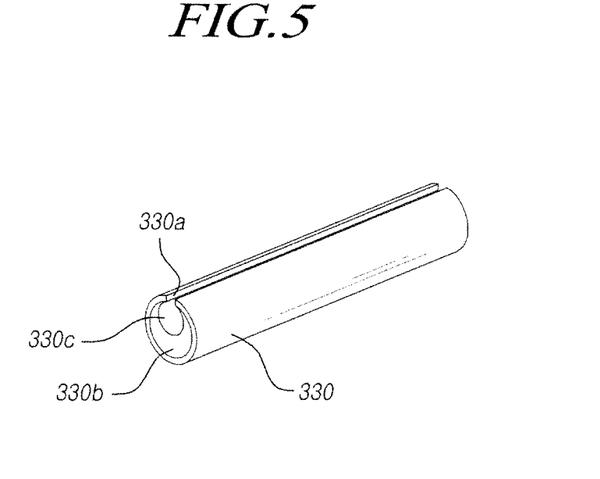
FIGS. 5 to 8 are perspective views illustrating resilient support members according to various embodiments of the present invention.

The resilient support member 330 illustrated in FIG. 5 may be formed by inserting and coupling the damping member 330b formed separately thereinto or by integrally injection-molding the damping member 330b.

If the damping member 330b is coupled into or integrally formed with the resilient support member 330, vibrations and noise generated by the nut pulley 315 and the ball nut 313 when a rotating force is transmitted by the drive belt 301 or vibrations and noise transmitted through the balls and the rack bar 311 when the ball nut 313 is rotated can be absorbed and damped.

A space 330c may be provided between an inner side of the cutaway portion 330a and the damping member 330b to increase a resilient force as well as a damping force.

Figure 6:
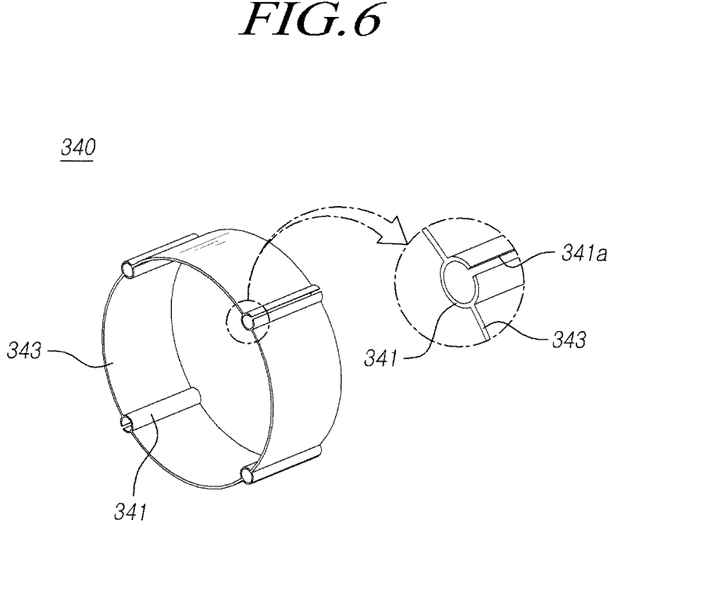
Figure 7:
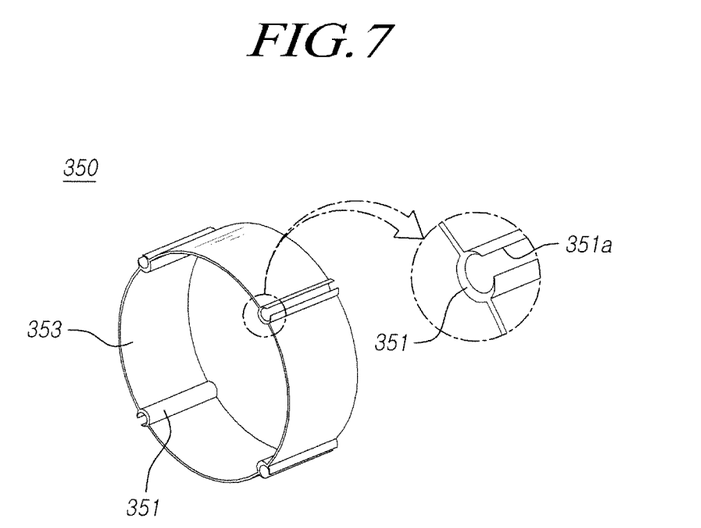
Figure 8:
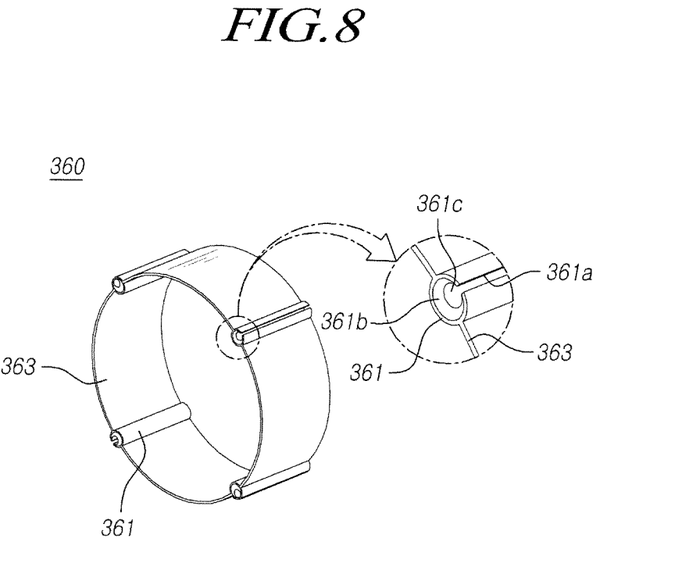
Figure 9:
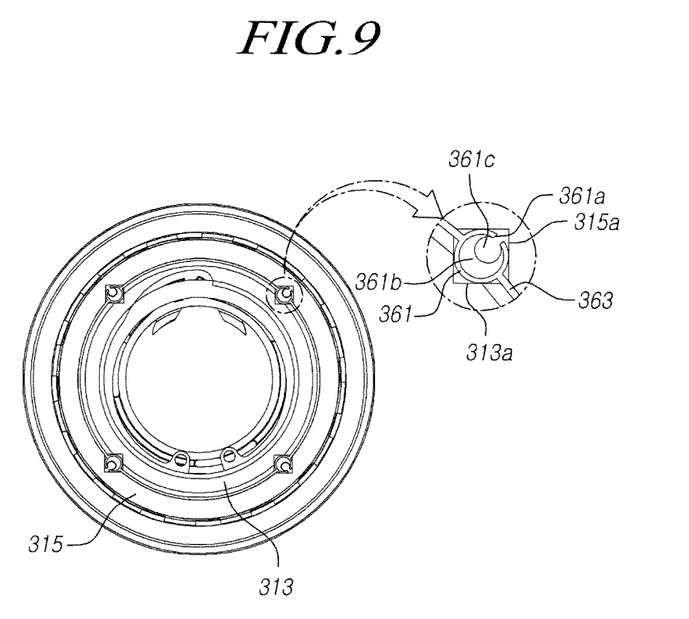
FIG. 9 is a front view illustrating a portion of a rack-driven auxiliary power steering apparatus illustrated in FIG. 8.

As illustrated in FIGS. 6 to 8, the resilient support member 340, 350, or 360 may be substantially ring-shaped, and may have a support portion 341, 351, or 361 and a connecting portion 343, 353, or 363 to be inserted between the nut pulley 315 and the ball nut 313.

That is, in the embodiments illustrated in FIGS. 6 to 8, the resilient support member 340, 350, or 360 may have a support portion 341, 351, or 361 having a hollow shape coupled to the space defined by the first groove 313a and the second groove 315a and having a cutaway portion 341a, 351a, or 361a cut axially from one end to an opposite end thereof, and a connecting portion 343, 353, or 363 circumferentially connecting outer peripheral surfaces of the support portions.

The support portion 341, 351, or 361 is coupled to the space defined by the first groove 313a of the ball nut 313 and the second groove 315a of the nut pulley 315 to generate a resilient force, and has a cylindrical shape obtained by bending a thin plate formed of a material such as a metal, plastic, and rubber, and has the cutaway portion 341a, 351a, or 361a axially cut from one end to an opposite end thereof so that when the support portion 341, 351, or 361 is coupled to the first groove 313a and the second groove 315a, a resilient force is generated by the support portion 341, 351, or 361 to widen the resilient support member 320 outward, supporting the ball nut 313 and the nut pulley 315.

The support portion 351 of the resilient support member 350 according to the embodiment illustrated in FIG. 7 becomes thicker as it goes from the cutaway portion 351a toward an inner center thereof, increasing a resilient support force of the support portion 351.

As illustrated in FIGS. 8 and 9, the support portion 361 may be formed by inserting and coupling a damping member 361b formed separately thereinto or integrally injection-molding the damping member 361b, and a space 361c may be provided between an inner side of the cutaway portion 361a and the damping member 361b to increase a resilient force as well as a damping force.

If the damping member 361b is coupled into or integrally formed with the support portion 361, vibrations and noise generated by the nut pulley 315 and the ball nut 313 when a rotating force is transmitted by the drive belt 301 or vibrations and noise transmitted through the balls and the rack bar 311 when the ball nut 313 is rotated can be absorbed and damped.

In the various embodiments, the support portions 341, 351, or 361 are connected to each other by the connecting portions 343, 353, or 363 in a substantially ring-shape, and the resilient support member can be easily assembled between the ball nut 313 and the nut pulley 315 as the connecting portions 343, 353, or 363 circumferentially connect outer peripheral surfaces of the support portions 341, 351, or 361.

Thus, if the resilient support member is coupled to an outer peripheral surface of the ball nut 313 and the nut pulley 315 is coupled to the ball nut 313 while the support portions 341, 351, or 361 are contracted, the support portions 341, 351, or 361 are widened to be attached to and supported by the first groove 313a and the second groove 315a, preventing the ball nut 313 and the nut pulley 315 from idling and increasing power transmission efficiency, and damping vibrations and noise transferred through the drive belt 301, the nut pulley 315, the ball nut 313, the rack bar 311, and the balls.

Meanwhile, in order to perform a damping operation of absorbing noise and vibrations, the damping member is formed of a material such as natural rubber (NR), polybutadiene rubber (BR), nitrile butadiene rubber (NBR), chloroprene rubber (CR), ethylene propylene terpolymer (EPDM), fluoro elastomer (FPM), styrene butadiene rubber (SBR), chlorosulphonated polyethylene (CSM), silicon, and urethane to have a weatherproof property and flexibility while properly absorbing vibrations and noise.

As described above, the present invention prevents the ball nut and the nut pulley from idling due to a slip thereof when the drive belt is operated, increasing durability while increasing power transmission efficiency, and minimizes vibrations and noise transferred through the rack bar, the ball nut, and the nut pulley when the rack bar is slid while the nut pulley and the ball nut are rotating, providing a comfortable steering feeling to the driver.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack-driven auxiliary power steering apparatus comprising:
   a ball nut coupled to a rack bar via balls and having a first axial groove on an outer peripheral surface thereof;
   a nut pulley coupled to the outer peripheral surface of the ball nut and having a second axial groove at a location corresponding to the first axial groove; and
   a resilient support member coupled between the ball nut and the nut pulley,
   wherein the resilient support member is arranged in a space defined by the first axial groove and the second axial groove,
   wherein the resilient support member has a hollow shape coupled to the space defined by the first axial groove and the second axial groove, and has a cutaway portion cut axially from one end to an opposite end thereof.

2. The rack-driven auxiliary power steering apparatus as claimed in claim 1, wherein a damping member is inserted into and coupled to an interior of the resilient support member.

3. The rack-driven auxiliary power steering apparatus as claimed in claim 1, wherein a damping member is integrally molded in an interior of the resilient support member.

4. The rack-driven auxiliary power steering apparatus as claimed in claim 2 or 3, wherein the resilient support member has a space between an inner side of the cutaway portion and the damping member.

5. The rack-driven auxiliary power steering apparatus as claimed in claim 4, wherein the damping member is formed of one material of natural rubber (NR), polybutadiene rubber (BR), nitrile butadiene rubber (NBR), chloroprene rubber (CR), ethylene propylene terpolymer (EPDM), fluoro elastomer (FPM), styrene butadiene rubber (SBR), chlorosulphonated polyethylene (CSM), silicon, and urethane.

6. A rack-driven auxiliary power steering apparatus comprising:
   a ball nut coupled to a rack bar via balls and having a first axial groove on an outer peripheral surface thereof;
   a nut pulley coupled to the outer peripheral surface of the ball nut and having a second axial groove at a location corresponding to the first axial groove; and
   a resilient support member coupled between the ball nut and the nut pulley,
   wherein the resilient support member is arranged in a space defined by the first axial groove and the second axial groove, and
   wherein the resilient support member includes:
   support portions each of which has a hollow shape coupled to the space defined by the first axial groove and the second axial groove and has a cutaway portion cut axially from one end to an opposite end thereof; and
   connecting portions circumferentially connecting outer peripheral surfaces of the support portions to each other.

7. The rack-driven auxiliary power steering apparatus as claimed in claim 6, wherein a damping member is inserted into each of the support portions.

8. The rack-driven auxiliary power steering apparatus as claimed in claim 6, wherein a damping member is integrally molded in an interior of each of the support portions.

9. The rack-driven auxiliary power steering apparatus as claimed in any one of claims 2, 3, 7, and 8, wherein the damping member is formed of one material of natural rubber (NR), polybutadiene rubber (BR), nitrile butadiene rubber (NBR), chloroprene rubber (CR), ethylene propylene terpolymer (EPDM), fluoro elastomer (FPM), styrene butadiene rubber (SBR), chlorosulphonated polyethylene (CSM), silicon, and urethane.

10. The rack-driven auxiliary power steering apparatus as claimed in claim 7 or 8, wherein each of the support portions has a space between an inner side of the cutaway portion and the damping member.

11. The rack-driven auxiliary power steering apparatus as claimed in claim 10, wherein the damping member is formed of one material of natural rubber (NR), polybutadiene rubber (BR), nitrile butadiene rubber (NBR), chloroprene rubber (CR), ethylene propylene terpolymer (EPDM), fluoro elastomer (FPM), styrene butadiene rubber (SBR), chlorosulphonated polyethylene (CSM), silicon, and urethane.

* * * * *